May 27, 1958  W. D. SHADWICK ET AL  2,836,461
TRAILER HOPPER
Filed Aug. 16, 1954  3 Sheets-Sheet 1
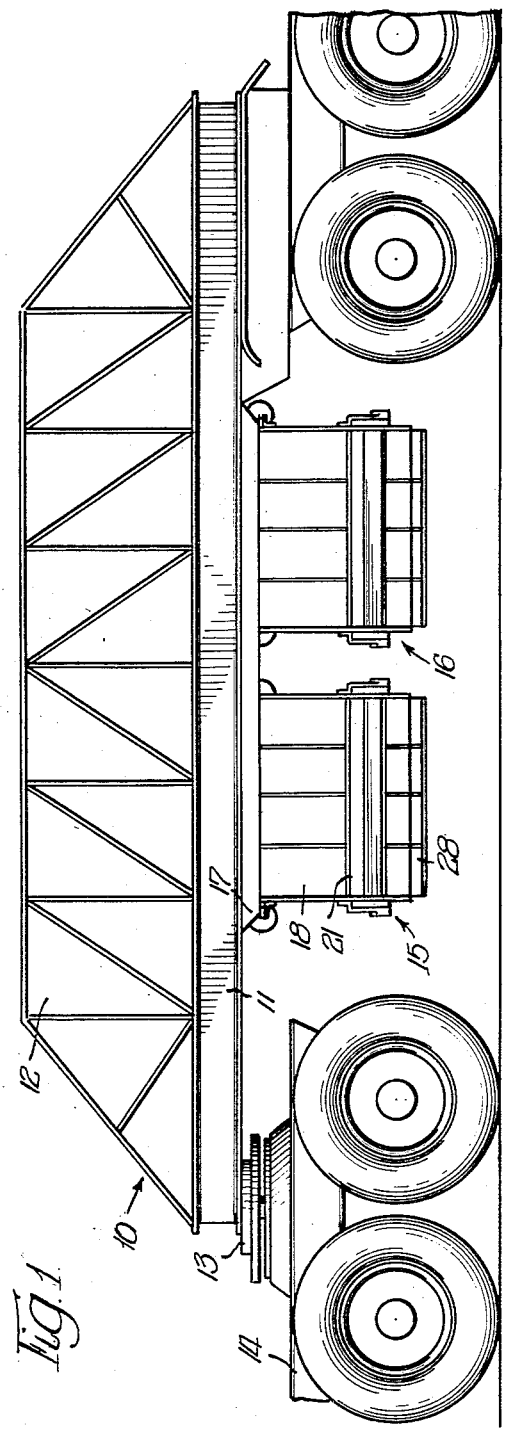
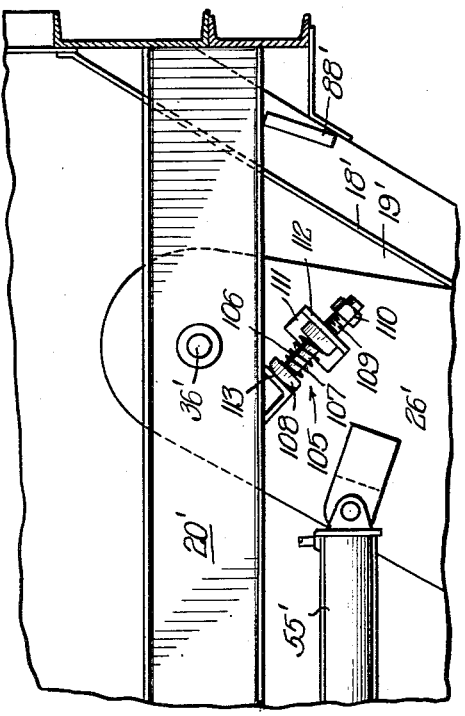
INVENTORS
William D. Shadwick,
BY Myles Standish,
Wilkinson, Huxley,
Byron, & Hume  ATTYS.

May 27, 1958 W. D. SHADWICK ET AL 2,836,461
TRAILER HOPPER
Filed Aug. 16, 1954 3 Sheets-Sheet 2

INVENTORS
William D. Shadwick,
BY Myles Standish,
Wilkinson, Huxley
Byron, & Hume ATTYS May 27, 1958 W. D. SHADWICK ET AL 2,836,461
TRAILER HOPPER
Filed Aug. 16, 1954 3 Sheets-Sheet 3

INVENTORS.
William D. Shadwick,
BY Myles Standish,
Wilkinson, Huxley
Byron, & Hume ATTYS.

United States Patent Office 2,836,461
Patented May 27, 1958

2,836,461

TRAILER HOPPER

William D. Shadwick, Council Bluffs, Iowa, and Myles Standish, Omaha, Nebr., assignors to Omaha Standard, Inc., Council Bluffs, Iowa, a corporation of Iowa Application August 16, 1954, Serial No. 449,982

13 Claims. (Cl. 298—35)

This invention relates to a discharge mechanism for hoppers, such as are employed in dump trailers of semi-trailer type vehicles.

It is an object of the present invention to provide a discharge mechanism which is operated by a hydraulic cylinder and piston.

It is a further object of this invention to provide a novel latch mechanism for the doors of a hopper.

It is another object of the invention to provide a dump trailer with an improved form of door mechanism having associated therewith a new latching and operating mechanism of simple and effective construction.

One form which the invention may assume is exemplified and illustrated by way of example in the accompanying drawings.

Further objects and advantages of this invention will become evident as the description proceeds and from an examination of the accompanying drawings which illustrate one embodiment of the invention and in which similar numerals refer to similar parts throughout the several views.

In the drawings:

Figure 1 is a side elevation of the dump trailer attached to a tractor, showing the hoppers.

Figure 4 is an enlarged, fragmentary showing of a modification of the door retarding mechanism.

Figure 2:
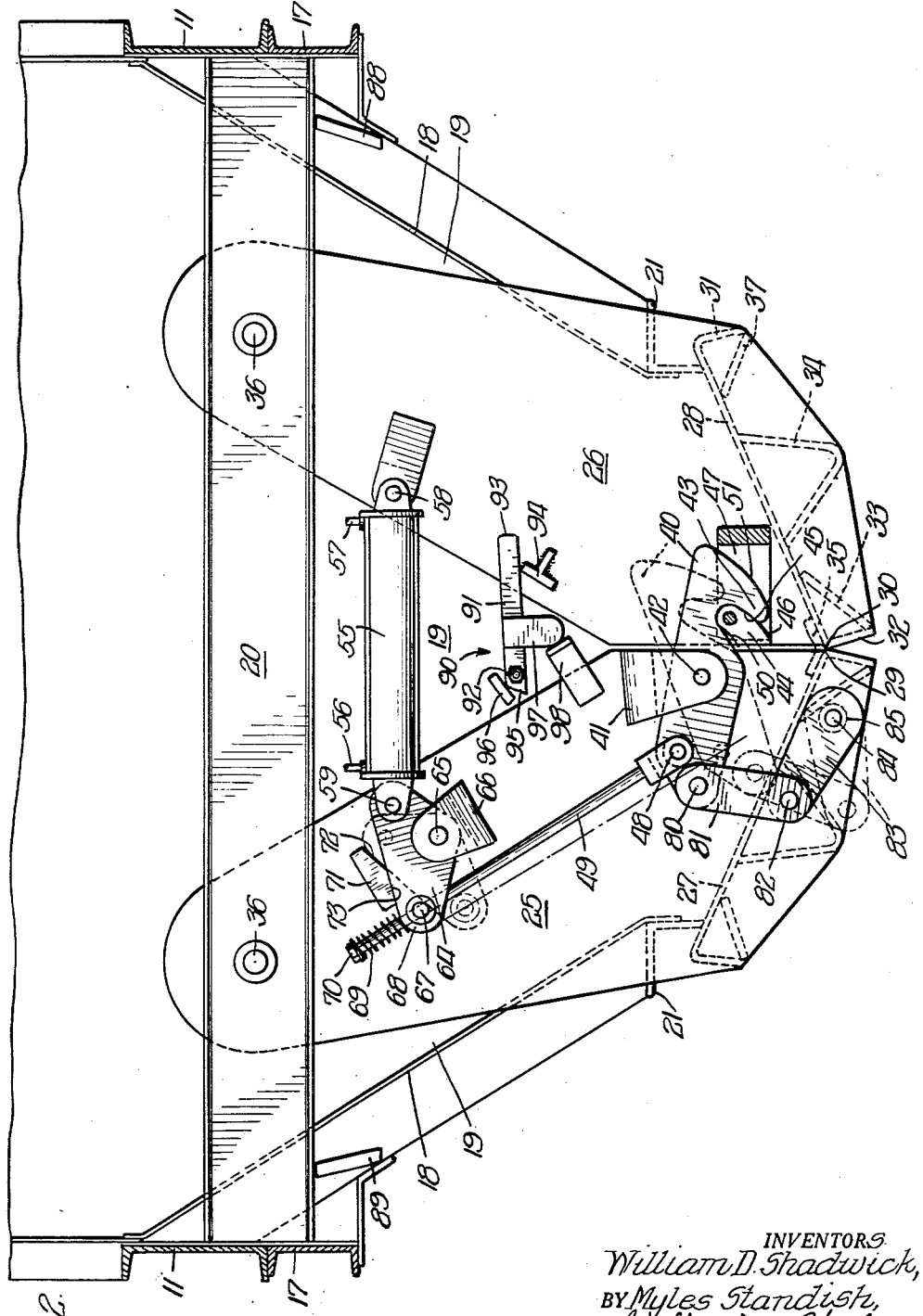
Figure 2 is an enlarged, fragmentary end view of one hopper, showing the latching and operating mechanism embodying the invention.

Referring more particularly to the accompanying drawings, 10 indicates a semitrailer type of dump truck attached at 13 to the rear 14 of a usual tractor (not shown) in conventional semitrailer fashion. The dump trailer comprises a main frame 11, which is disposed in a substantially horizontal plane. Supported on the main frame 11 is the trailer bed or body 12. The dump trailer 10 is provided with a subframe 17, and hoppers 15 and 16. Hoppers 15 and 16 are alike. Each hopper is provided at each end with a latching and operating mechanism as shown in Figures 2 and 3.

Figure 3:
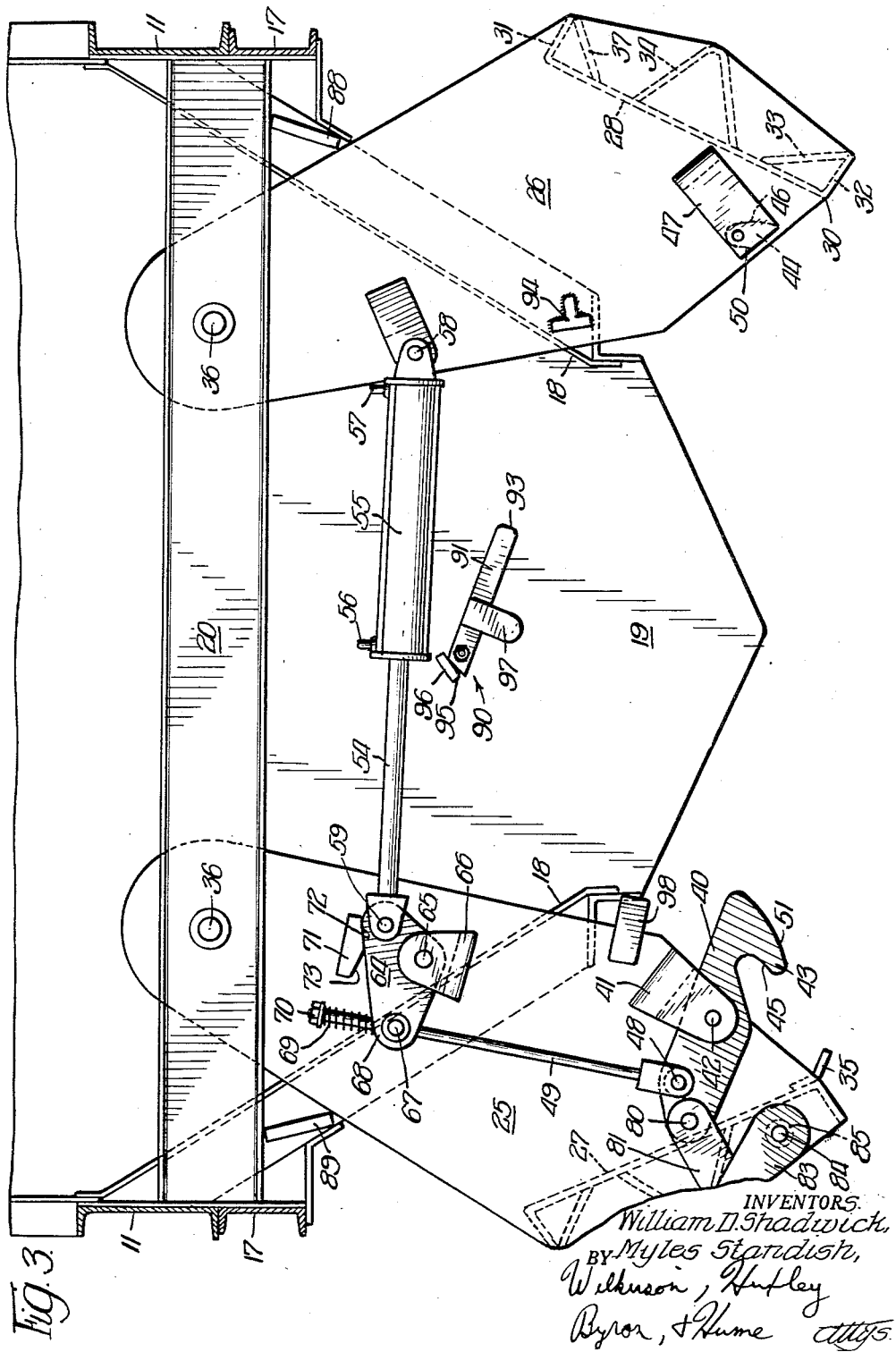
Figure 3 is an enlarged, fragmentary end view of the latching and operating mechanism shown in Figure 2, with the doors opened.

Referring now to Figures 2 and 3, there is disclosed, in an enlarged view, the latching and operating mechanism embodying the invention, which is mounted on both ends of each of the hoppers 15 and 16. The hoppers are provided with gates or doors 27 and 28 at the lower portion thereof, connected at their ends to suspension links 25 and 26. Gates or doors 27 and 28 close the opening at the bottom of hopper 15 and are inclined upwardly from their meeting edges 29 and 30. The doors 27 and 28 are adapted to swing outwardly on suspension links 25 and 26 about the pivotal connection 36 of suspension links 25 and 26 to cross beam 20.

Both doors 25 and 26 have the same construction, and the description of door 28, referred to hereinafter, is the same for door 25. Door 28 is provided with an outer flange 31 and an inner flange 32 at meeting edge 30. Brace 37 is fitted between outer flange 31 and door 28. Brace 33 is fastened to inner flange 32 and door 28.

A stiffening brace 34 is provided to extend longitudinally along the central portion of gate 28.

A duplicate set of latch mechanisms at each end of the hopper holds the doors in closed position, so that the doors are firmly hooked. In Figures 2 and 3 is illustrated a latch mechanism at one end of hopper 15. As shown, a latch lever 40 is pivotally mounted on bracket 41 by a pin 42. Latch lever 40 is provided at one end with a keeper or hook 43, adapted to cooperate with keeper lug or catch 44 on the suspension link 26.

The keeper or hook 43 of latch lever 40 is provided with a recess having an inner arcuate shoulder 45 for sliding contact with keeper lug 44. Keeper lug 44 is provided with a complementary outer arcuate shoulder 45 having the same radius of curvature as the shoulder 46 of the keeper 44. The arcuate shape of these shoulders is critical as the doors are held in closed position without cylinder pressure, which might be lost, and still permits hook 43 to be withdrawn without any motion of catch 44 or the doors.

The keeper lug 44 is also provided with a cam shoulder 50 adapted to cam upwardly the shoulder 51 on latch lever 40. The keeper lug or catch 44 is mounted in a bracket or guard 47, shown partly in section in Figure 2.

The operating mechanism includes hydraulic cylinder 55 having a double action piston connected to a hydraulic power mechanism by fluid lines 56 and 57. The power mechanism includes a pump and control valve (not shown) for regulating the flow of hydraulic fluid to cylinder 55 and operating the double action piston. Hydraulic cylinder 55 is pivotally connected at one end at 58 to suspension link 26, and is provided with a piston 54 pivotally connected at 59 to bell crank 64. The hydraulic cylinder 55 operates to open and close the suspension links 25 and 26 and doors 27 and 28 for discharging the load from the dump trailer 10. Cylinder 55 and bell crank 64 also operate the latching mechanism.

Bell crank 64 is pivotally mounted at 65 to bracket 66 on suspension link 25. The bell crank 64 has one arm pivotally connected at 67 to a sleeve 68 on rod 49. The sleeve 68 abuts a shoulder or bracket (not shown) on connecting rod 49 to pivot latch lever 40 about pin 42 to unlatched position. The connecting rod 49 is provided at the upper end with a spring 69 above sleeve 68, and a tension adjusting nut 70. A stop 71 is mounted on suspension link 25 above bell crank 64 and provided with a shoulder 72 to engage one arm of bell crank 64 when the hydraulic cylinder 55 is opening the links 25 and 26, and another shoulder 73 to engage the other arm of bell crank 64 when cylinder 55 is closing suspension links 25 and 26. The full line showing in Figure 2 is of the latching mechanism in latched position. The keeper 43 cooperates with keeper lug 44 to hold the suspension links 25 and 26 and gates 27 and 28 closed without the benefit of hydraulic cylinder 55. In opening the gates 27 and 28, the hydraulic cylinder first moves the bell crank 64 to the dotted line showing in Figure 2, so that one arm of bell crank 64 rotates about 65. This forces connecting rod 49 downwardly through connection 67 to sleeve 68 and a shoulder or bracket on connecting rod 49 (not shown). The downward thrust of connecting rod 49 pivots latch lever 40 about pin 42 so that the keeper 43 is disengaged from keeper lug 44.

The doors 27 and 28 swing open on suspension links 25 and 26 about pivots 36, to the position shown in Figure 3 in which suspension link 26 abuts stop 83 and suspension link abuts stop 89.

Each end of hopper 15 and hopper 16 is provided with the latching and operating mechanism, including the hydraulic piston and cylinder, shown in Figures 2 and 3. In order to provide synchronization between the operating and latching mechanisms at the ends of the hoppers, a synchronizing mechanism is provided. As shown in Figures 2 and 3, link 81 is pivotally connected at 80 to latch lever 40 and at 82 to crank arm at 83. Crank arm 83 is connected at 84 to a rock shaft 85 which is connected to an identical mechanism at the other end of the hopper. Thus, as the latch lever 40 is pivoted about pin 42, it operates through link 80 to turn crank arm 83 and rotate rock shaft 85 connected to another latch mechanism at the other end of the hopper, so that the latch mechanism operation is effectively synchronized.

In closing the links 25 and 26, and gates 27 and 28, there is a tendency for the lighter suspension link 26 to close before suspension link 25. If this happens, it is difficult to cam the keeper 43 over the keeper lug 44. In order to prevent any difficulty, a mechanical door retarder mechanism is provided, shown generally by reference numeral 90. The mechanical door retarder mechanism 90 is provided with an arm 91 pivotally connected at 92 to end plate 19. The shoulder 93 and one end of arm 91 are adapted to abut stop 94 on suspension link 26. A shoulder 95 at the other end of arm 91 cooperates with stop 96 mounted on end plate 19, to hold the door retarder mechanism in the position shown in Figure 3. As the links 25 and 26 are closed, the shoulder 93 on arm 91 abuts stop 94 to hold suspension link 26 and door 28 from closing. As the other suspension link 25 is closed, flange 98 on suspension link 25 hits flange 97 on arm 91, to knock the shoulder 93 off the top 94 and permit suspension link 26 to close.

The operation of the latching and operating mechanism should be apparent from the foregoing. The hydraulic pressure is applied to cylinder 55 through the proper fluid line. This hydraulic pressure forces the bell crank 64 outward about point 65 causing downward pressure on rod 49 by virtue of a shoulder on rod 49. Upon rod 49 being forced downward, latch lever 40 rotates about pin 42 separating the keeper 43 to the position shown by dotted lines in Figure 2. Upon this operation, the doors 27 and 28 are free to open and the continued hydraulic pressure on cylinder 55 rotates bell crank 64 about point 65 until it engages shoulder 72 of stop 71, thus continuing the thrust on suspension links 25 and 26 forcing apart doors 27 and 28.

The weight of the material, as well as the weight of the doors, cause the gates to swing open by gravity until the gates are opened to a point beyond which the weight will not push them. The hydraulic cylinder 55 continues to force them apart until suspension link 26 engages stop 88 and link 25 engages stop 89, and the piston has been moved the full length of its stroke.

In the closing cycle, the pressure is supplied to the opposite end 55 which then rotates bell crank 64 from the dotted line position to the full line showing in Figure 2, until it engages shoulder 73 of stop 71, at which time suspension links 25 and 26 are drawn together and gates 27 and 28 begin to close. The suspension link 26, being lighter than suspension link 25, tends to close first, with the result that latch lever 40 tends to undercut keeper lug 44 so that it will not proceed further. However, the door retarding mechanism 90 holds off suspension link 26 by engaging stop 94. As the lighter suspension link is drawn closed, it is stopped by the end 93 of arm 91. When the heavier suspension link 25 comes up, it knocks arm 91 off stop 94 by flange 98 abutting arm 97. The hydraulic cylinder 55 now pulls bell crank 64 firmly against shoulder 72 of stop 71, and the shoulder 50 of keeper lug 44 will raise keeper 43 fully closing the doors, and permitting keeper 43 to snap back into place by spring 69 mounted on rod 49.

It has been found in many installations that it is advisable to have a closing strip 35 between the doors 27 and 28. Closing strip 35 is mounted on door 27 and extends longitudinally along the meeting edge 29 of door 27. Closing strip 35 must be on the gate that comes up first, otherwise it will hit the other door and prevent their closing.

In Figure 4 there is shown a modified form of door retarder mechanism. This modified form employs a spring retarder instead of the mechanical retarder disclosed in Figures 2 and 3. In Figure 4, suspension link 26' is pivotally mounted at 36' on cross beam 20' in a suitable hopper having side walls 18' and an end plate 19'. A cylinder 55' is mounted on suspension link 26' for opening and closing the doors of the hopper. The door retarder mechanism 105 is provided with a bolt 106 having thereon a spring 107. The bolt 106 has a head 108 and screw threads 109. Spring 107 is mounted between head 108 and a bracket provided with a base 111 attached to suspension link 26' and an upright member 112. The upright member 112 has an aperture therein (not shown) for bolt 106. It will be seen that the spring 107 urges the head 108 away from the bracket 112. A stop 113 is mounted on cross beam 20' adapted to abut the head 108 on bolt 106. When the lighter suspension link 26' is drawn closed, it is held open by head 108 abutting stop 113 until the other suspension link (not shown) is closed, at which time suspension link 26' is closed by compressing spring 107 between head 108 and bracket 112.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

1. In a hopper means for a load receptacle having a main frame, the combination which comprises a pair of laterally swinging doors for opening and closing movements, said doors inclined upwardly and outwardly from their meeting edge, suspension links connected to the ends of said doors and pivotally mounted on the lower portion of said main frame for swinging movement, a double action hydraulic piston and cylinder mounted between a pair of a said suspension links for opening and closing said doors and for operating a latch mechanism, said piston operatively connected to one link in said pair, said cylinder operatively connected to the other link in said pair, a latch mechanism including a latch lever mounted on one suspension link and a catch mounted on another suspension link, said latch mechanism disposed below said hydraulic piston and cylinder at the lower portions of said suspension links for holding said doors in closed, latched hydraulic piston for latching and unlatching said position, and means connected to said hydraulic piston for latching an unlatching said latch mechanism.

2. In a hopper means for a load receptacle having a main frame, the combination which comprises a pair of laterally swinging doors for opening and closing movements, said doors inclined upwardly and outwardly from their meeting edge, suspension links connected to the ends of said doors pivotally and mounted on the lower portion of said main frame for swinging movement, a latch mechanism between said suspension links for holding said doors in closed position, a double action hydraulic piston and cylinder mounted between a pair of said suspension links for opening and closing said doors and for operating said latch mechanism, said cylinder operatively connected to one link in said pair, said piston operatively connected to the other link in said pair, and means for operating said latch mechanism including a bell crank having one arm connected to said hydraulic piston and the other arm connected to said latch mechanism.

3. In a hopper means for a load receptacle having a main frame, the combination which comprises a pair of laterally swinging doors for opening and closing movements, suspension links connected to the ends of said doors and pivotally mounted on the lower portion of said main frame for swinging movement, a hydraulic means mounted between said suspension links for opening and closing said doors and for operating a latch mechanism, a bell crank pivotally mounted on a suspension link, said bell crank having one arm connected to said hydraulic means, a stop mounted on said suspension link for abutting one arm of said bell crank for transmitting the force of said hydraulic piston to said suspension links to open said doors, and for abutting the other arm of said bell crank for transmitting the force of said hydraulic piston to said suspension links for closing said doors, and a latch mechanism including a latch lever pivotally mounted on the lower portions of said suspension links for holding said doors in closed position.

4. In a hopper means for a load receptacle having a main frame, the combination which comprises a pair of laterally swinging doors for opening and closing movements, suspension links connected to the ends of said doors and pivotally mounted on the lower portion of said main frame for swinging movement, a double action hydraulic piston and cylinder mounted between said suspension links for opening and closing said doors and for operating a latch mechanism, a bell crank pivotally mounted on a suspension link, said bell crank having one arm connected to said hydraulic piston, a stop mounted on said suspension link having a first shoulder for abutting one arm of said bell crank for transmitting the force of said hydraulic piston to said suspension links to open said doors, a second shoulder on said stop for abutting the other arm of said bell crank for transmitting the force of said hydraulic piston to said suspension links for closing said doors, a latch lever including a downwardly projecting hook pivotally mounted on the lower portion of said suspension link for holding said links in closed latched position, a lug mounted on said other suspension link for engagement with said latch lever, and a connecting rod pivotally connected to the other arm of said bell crank and to said latch lever.

5. In a hopper means for a load receptacle having a main frame, the combination which comprises a pair of laterally swinging doors for opening and closing movements, said doors inclined upwardly and outwardly from their meeting edge, suspension links connected to the ends of said doors and pivotally mounted on the lower portion of said main frame for swinging movement, a double action hydraulic piston and cylinder mounted between said suspension links for opening and closing said doors and for operating a latch mechanism, means operatively connecting said hydraulic piston and cylinder to said latch mechanism, said latch mechanism including a hook and a catch, said hook and catch provided with complementary arcuate shoulders for engagement in latched position having the same radius of curvature.

6. In a hopper means for a load receptacle having a main frame, the combination which comprises a pair of laterally swinging doors for opening and closing movements, said doors inclined upwardly and outwardly from their meeting edge, suspension links connected to the ends of said doors and pivotally mounted on the lower portion of said main frame for swinging movement, a double action hydraulic piston and cylinder mounted between said suspension links for opening and closing said doors and for operating a latch mechanism, means operatively connecting said hydraulic piston and cylinder to said latch mechanism, said latch mechanism including a hook and a catch, said hook having a downwardly projecting member for engaging said catch, said downwardly projecting member having an inner arcuate shaped shoulder for sliding contact with said catch, and said catch provided with a complementary arcuate shoulder, said shoulders on said hook and catch having the same radius of curvature.

7. In a hopper means for a load receptacle having a main frame, the combination which comprises a pair of laterally swinging doors for opening and closing movements, said doors inclined upwardly and outwardly from their meeting edge suspension links connected to the ends of said doors and pivotally mounted on the lower portion of said main frame for swinging movement, a double action hydraulic piston and cylinder mounted between said suspension links for opening and closing said doors and for operating a latch mechanism, means operatively connecting said hydraulic piston and cylinder to said latch mechanism, said latch mechanism including a hook and a catch, said hook having a recess and an arcuate shaped shoulder in said recess for sliding contact with said catch, and said catch provided with a complementary arcuate shoulder, said shoulders on said hook and catch having the same radius of curvature.

8. In a hopper means for a load receptacle having a main frame, the combination which comprises a pair of laterally swinging doors for opening and closing movements, suspension links connected to the ends of said doors and pivotally mounted on the lower portion of said main frame for swinging movement, a double action hydraulic piston and cylinder mounted between said suspension links for opening and closing said doors and for operating a latch mechanism, means operatively connecting said hydraulic piston and cylinder to said latch mechanism, said latch mechanism including a hook mounted on one suspension link and a catch mounted on another suspension link, said hook and catch provided with complementary arcuate shoulders having the same radius of curvature.

9. In a hopper means for a load receptacle having a main frame, the combination which comprises a pair of laterally swinging doors for opening and closing movements, suspension links connected to the ends of said doors and pivotally mounted on the lower portion of said main frame for swinging movement, a double action hydraulic piston and cylinder mounted between said suspension links for opening and closing said doors and for operating a latch mechanism, means operatively connecting said hydraulic piston and cylinder to said latch mechanism, said latch mechanism including a hook mounted on one suspension link and a catch mounted on an adjacent suspension link, said hook having a downwardly projecting member for engaging said catch, said downwardly projecting member having an inner arcuate shaped shoulder for sliding contact with said catch, and said catch provided with a complementary arcuate shoulder, said shoulders on said hook and catch having the same radius of curvature.

10. In a hopper means for a load receptacle having a main frame, a pair of doors located below the hopper opening for opening and closing movements, suspension links connected to the ends of said doors and pivotally mounted on the lower portion of said main frame for swinging movement, a latch mechanism mounted on a pair of said suspension links for holding said doors closed, a double action hydraulic piston and cylinder mounted between said suspension links for opening and closing said doors and for operating said latch mechanism, and a door retarder means operatively connected to a suspension link to prevent one door from closing before the other.

11. In a hopper means for a load receptacle having a main frame, a pair of doors located at the hopper opening for opening and closing movements, suspension links connected to the ends of said doors and pivotally mounted for swinging movement, a latch mechanism for holding said doors closed, a double action hydraulic piston and cylinder mounted on the lower portion of said main frame between said suspension links for opening and closing said doors and for operating said latch mechanism, means operatively connecting said hydraulic piston and cylinder to said latch mechanism, and a door retarder means to prevent one door from closing before the other which comprises an arm pivotally mounted on said hopper between said suspension links for holding one suspension link open, and means on the other suspension link for knocking said arm off said first suspension link and permitting said doors to close together.

12. In a dump trailer, a hopper, a pair of laterally swinging doors for opening and closing said hopper, a pair of suspension links for each end of said pair of doors, said suspension links connected to the ends of said doors and pivotally mounted to said hopper, an operating and latching mechanism mounted between each pair of suspension links which comprises: a double action hydraulic piston and cylinder mounted between said suspension links for opening and closing said doors and for operating a latch mechanism, a bell crank pivotally mounted on a first suspension link, said bell crank having one arm connected to said hydraulic piston, a stop mounted on said first suspension link for abutting the arms of said bell crank for transmitting the force of said hydraulic piston to said suspension links for opening and closing said doors, and a latch mechanism connected to said bell crank for holding said doors closed.

13. In a dump trailer, a hopper, a pair of laterally swinging doors for opening and closing said hopper, a pair of suspension links for each end of said pair of doors, said suspension links connected to the ends of said doors and pivotally mounted to said hopper, an operating and latching mechanism mounted between each pair of suspension links which comprises: a double action hydraulic piston and cylinder mounted between said suspension links for opening and closing said doors and for operating a latch mechanism, bell cranks pivotally mounted on a first suspension link, said bell cranks having one arm connected to said hydraulic piston, a stop mounted on said first suspension link for abutting the arms of said bell crank for transmitting the force of said hydraulic piston to said suspension links for opening and closing said doors, a latch mechanism for holding said doors in closed position including a downwardly projecting hook pivotally mounted on the lower portion of said first suspension link, and a lug mounted on the other suspension link for engagement with said hook, and means operatively connecting said hydraulic piston and cylinder to said latch mechanism, said hook and lug having arcuate shoulders with the same radius of curvature.

References Cited in the file of this patent

UNITED STATES PATENTS

| | | |
|---|---|---|
| 1,087,343 | Abbot | Feb. 17, 1914 |
| 2,237,299 | Benbow et al. | Apr. 8, 1941 |
| 2,250,262 | Hill | July 22, 1941 |
| 2,268,290 | Landis | Dec. 30, 1941 |